United States Patent [19]
Iversen

[11] Patent Number: 5,550,707
[45] Date of Patent: Aug. 27, 1996

[54] LOW COST POWER SWITCHGEAR

[76] Inventor: Arthur H. Iversen, 15315 Sobey Rd., Saratoga, Calif. 95070

[21] Appl. No.: 387,351

[22] Filed: Feb. 13, 1995

[51] Int. Cl.$^6$ .................................................. H02B 1/14
[52] U.S. Cl. ........................ 361/617; 200/50.27; 218/89
[58] Field of Search .................................. 361/605, 607, 361/609, 615, 617; 174/67; 439/137–145; 200/50 AA, 50 R, 304–306; 218/1, 2, 46, 76, 77, 89, 156, 158

[56] References Cited

U.S. PATENT DOCUMENTS

| | | | |
|---|---|---|---|
| 4,086,452 | 4/1978 | Collins | 200/50 AA |
| 4,090,230 | 5/1978 | Fuller | 361/345 |
| 4,216,521 | 8/1980 | Merola | |
| 4,272,798 | 6/1981 | Merola | 361/617 |
| 4,285,026 | 8/1981 | Clausing | 361/617 |
| 4,795,602 | 7/1983 | Castonguay | 361/617 |
| 4,827,374 | 5/1989 | Dunn | 361/345 |
| 5,181,164 | 1/1993 | Beard | 361/345 |
| 5,486,978 | 1/1996 | Fishovitz | |

FOREIGN PATENT DOCUMENTS

| | | | |
|---|---|---|---|
| 224703A | 6/1987 | European Pat. Off. | 361/617 |
| 197709 | 9/1977 | U.S.S.R. | |

OTHER PUBLICATIONS

Current Limiting Switching by Squeezing Arcs into Narrow Insulating Slots, Lindmayer M. and Zhiqiang H. IEEE–CHMT, vol. 15, #2, Apr. 1992, pp. 160–165.

Primary Examiner—Gerald P. Tolin
Attorney, Agent, or Firm—Armstrong, Teasdale, Schlafly & Davis

[57] ABSTRACT

There is described a novel arc extinction method for use in switchgear, and improved, low cost power switchgear incorporating the novel arc quenching method. By physically severing the arc and the substantially simultaneous interposition of a high dielectric strength insulating barrier between the fixed contact and the moving contact, substantially consistent and predictable arc extinguishing characteristics are obtained. When the dielectric strength of the barrier exceeds the applied voltage, the arc cannot maintain itself nor can it reignite. Upon detection of a fault, moving contact 16 disengages from fixed contact 12 and retreats 28 from contact 12 creating arc 30. Insulating guillotine 24, in intimate sliding contact with the surface of insulating partition 18 moves 26 toward aperture 20 in partition 18. When edge 31 of guillotine 24 reaches aperture edge 33 of partition 18, arc 30 is severed and extinguished. The covering of aperture 20 by guillotine 24 insulates and isolates fixed contact 12 from moving contact 16 thereby substantially eliminating reignition of the arc. Partition 18 and guillotine 24 may be of high dielectric strength Teflon which withstands the direct action of intense arcs, is superior to ceramics in switchgear and has a low coefficient of sliding friction for the mating surfaces of guillotine 24 and partition 18.

11 Claims, 4 Drawing Sheets

LOW COST POWER SWITCHGEAR

BACKGROUND OF INVENTION

1. Field of Invention

The present invention relates to switchgear including switching and interrupting devices and their combination such as circuit breakers, transfer switches, combination circuit breakers and transfer switches, recloser apparatus and similar devices as used in connection with the generation, transmission, distribution and conversion of electric power.

2. Discussion of Prior Art

Present switchgear such as circuit breakers employ various means to extinguish the arc generated upon contactor opening under fault conditions. The behavior of switchgear is dependent on the current broken and the arc energy. Present techniques for arc extinction include; increasing the arc length, cooling the arc and splitting the arc into a number of series arcs. Methods to achieve the above include arc chutes of both the insulated plate and cold cathode types. The arc is resilient and can be stretched, and possesses resistance which can be increased by lengthening and by confinement. When the voltage drop across the arc equals the driving voltage, the arc is extinguished. Power arcs can evade deionization systems by swerving, by striking out in new and unexpected directions, and by reigniting after they appear to have been successfully extinguished. All present circuit breakers interrupt current shortly before a current zero due to arc instability at low currents.

OBJECTS AND SUMMARY OF THE INVENTION

The present invention provides a new method for extinguishing arcs in switchgear. By physically severing the arc and the substantially simultaneous interposition of a high dielectric strength insulating barrier between the fixed contact and the retreating moving contact, substantially consistent and predictable arc extinguishing characteristics are obtained. When the dielectric strength of the barrier exceeds the applied voltage, the arc cannot maintain itself or reignite. The short throw of the moving contacts enables short travel of the contacts to be obtained.

The present invention provides for the substantially consistent and predictable extinguishing of arcs in power switchgear.

The present invention provides for the substantial elimination of arc reignition in power switchgear.

The present invention provides for the construction of low cost power switchgear.

The present invention provides for the construction of compact power switchgear.

The present invention provides for short travel distance of the moving contacts in power switchgear.

BRIEF DESCRIPTION OF THE DRAWING FIGURES

DETAILED DESCRIPTION OF THE PREFERRED EMBODIMENT

Figure 1:
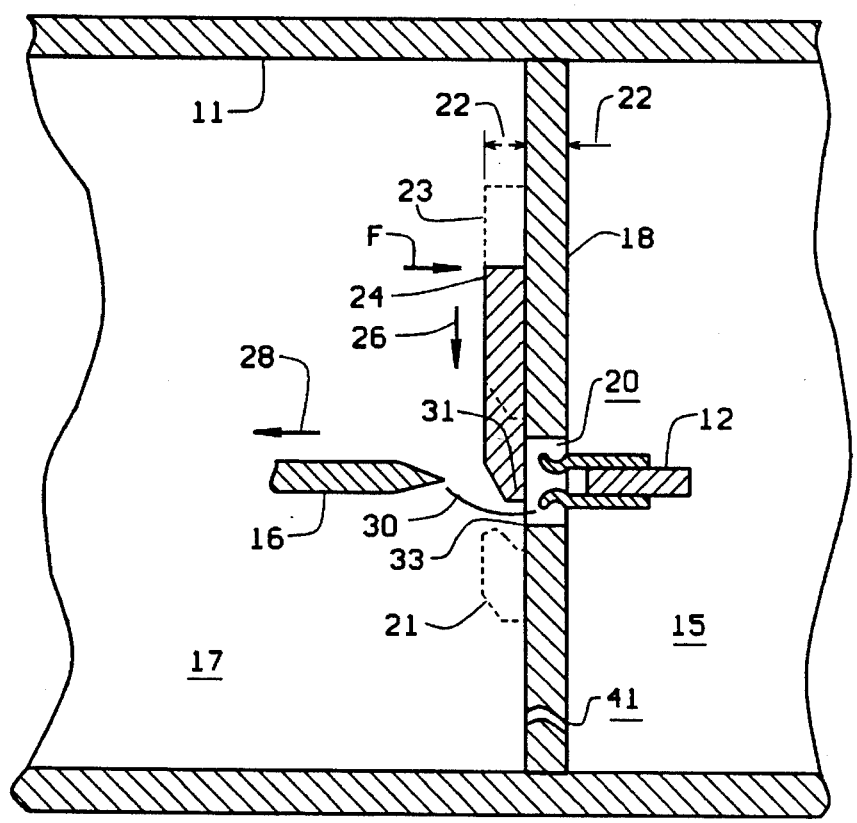
FIG. 1 is a partial cross section view of the present invention illustrating separation of contacts during the arcing process with the guillotine about to sever the arc.

For convenience, embodiments described herein will be described in terms of circuit breakers, and combination circuit breaker-transfer (bypass) switches. However, the same principles of construction and operation will apply to substantially all switchgear. The principles of construction and operation of the present invention are shown in FIG. 1. Referring now to FIG. 1, shown is moving contact 16 retreating 28 from fixed contact 12 in response to a short circuit or fault condition with resulting arc 30. Insulating partition 18 preferably extends across the complete internal cross section of housing 11, dividing it into two chambers, 15, 17 with only aperture 20 providing communication between the chambers. If communication between chambers 15, 17 is required, for example, for pressure equalization, a passage 41 distanced from aperture 20 that by virtue of placement and geometry inhibits passage of an arc may be provided in partition 18. A movable insulating member 24 herein called a guillotine iS in preferably intimate sliding contact with partition 18. The mating surfaces of partition 18 and guillotine 24 are smooth and flat to effectively provide a seal between the mating surfaces. In the open circuit condition where the moving contact 16 is spaced from the fixed contact 12 and guillotine 24 has covered aperture 20 the two chambers 15, 17 are effectively sealed off from each other.

A small force F applied to guillotine 24 and transmitted orthogonal to the mating surfaces of partition 18 and guillotine 24 may be applied to ensure that intimate contact is maintained between the sliding surfaces throughout all circuit opening and closing cycles. Such force F may be applied using, for example, leaf springs such as BeCu type leaf springs. To further reduce sliding friction, where appropriate, and provide a seal that can be substantially hermetic between the mating surfaces of 18 and 24, a suitably inert, non-conducting and high temperature lubricant suitable for use in the presence of arcs such as silicone or fluorocarbon oil may be used. This has the further benefit of increasing the dielectric strength of the partition 18 and guillotine 24 interface.

Figure 2:
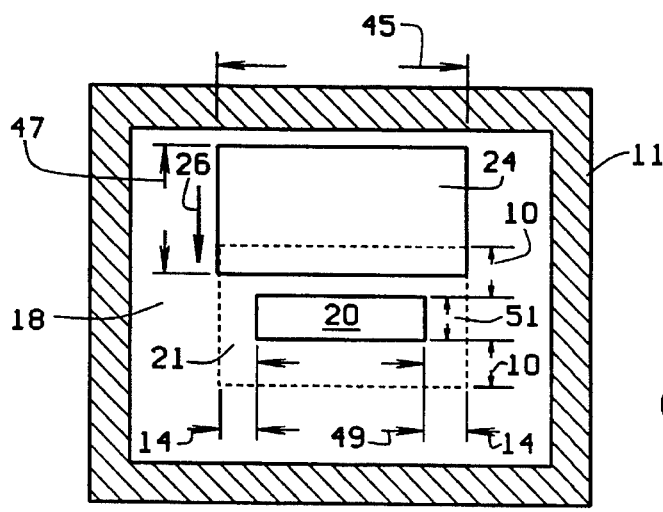
FIG. 2 is a cross section front view of the dielectric partition and guillotine.

Referring now to FIG. 2, the width 45 and length 47 dimensions of guillotine 24 are sufficiently larger than the width 49 and length 51 of aperture 20 such that there is sufficient overlap 14 and 10, shown in dotted outline 21, of the mating surfaces of guillotine 24 on partition 18 to prevent an arc propagating between the mating surfaces from contact 16 to contact 12 as guillotine 24 covers aperture 20 in reaching the open circuit position. This open circuit position is also shown in FIG. 1 in partial cross section with dotted lines 21. In the closed circuit condition when current is flowing, contacts 12 and 16 are engaged and guillotine 24 is distanced from aperture 20 as shown in the dotted outline 23, and as also shown 24 in the face on view of FIG. 2.

Referring again to FIG. 1, upon occurrence of a fault or other predetermined condition wherein the circuit must be opened and the flow of current interrupted, a mechanism, such as a conventional latch mechanism, commences to draw back movable contact 16 and disengage it from fixed contact 12 thereby interrupting the circuit. As contact 16 moves 28 away from contact 12, guillotine 24 proceeds to slide down the face of partition 18, as shown by arrow 26.

As edge 31 of guillotine 24 approaches aperture edge 33 of partition 18, arc 30 is pinched and then severed as edges 31 and 33 pass each other thereby sealing off chambers 15, 17 and extinguishing the arc. As long as the dielectric strength of partition 18 and guillotine 24 exceeds that of the applied voltage, the impedance between contacts 12 and 16 is effectively infinite and the arc cannot be maintained nor can it reignite With a dielectric strength of 19 kV/mm, a 3 mm, about one eighth of an inch thick piece of Teflon can stand off 57,000 V, more than enough for most applications. Should a high degree of rigidity be required for partition 18 and guillotine 24, a core structure of ceramic or other suitably rigid dielectric material may then be coated to a desired thickness, for example in the manner of frying pans, with Teflon or other suitable dielectric material. The interposition of the high dielectric strength barrier enables a short movement of the moving contacts to be obtained as the predominant electrical insulation is from the barrier. Instead of open circuit contact spacings measured in the 10 cm range at higher voltages, it is now about 1 cm. This short moving contact displacement permits compact switchgear size and high speed make and break of contacts.

In the final open circuit resting position, moving contact 16 is spaced from guillotine 24 with guillotine 24 shown in partial dotted outline 21. Referring again to FIG. 2, the open circuit resting position of guillotine 24 is also shown in dotted outline 21 as covering aperture 20 with sufficient horizontal 14 and vertical 10 overlap on to partition 18 to prevent an arc from propagating through the intimate interface of 18 and 24 from contact 12 to contact 16.

Figure 3:
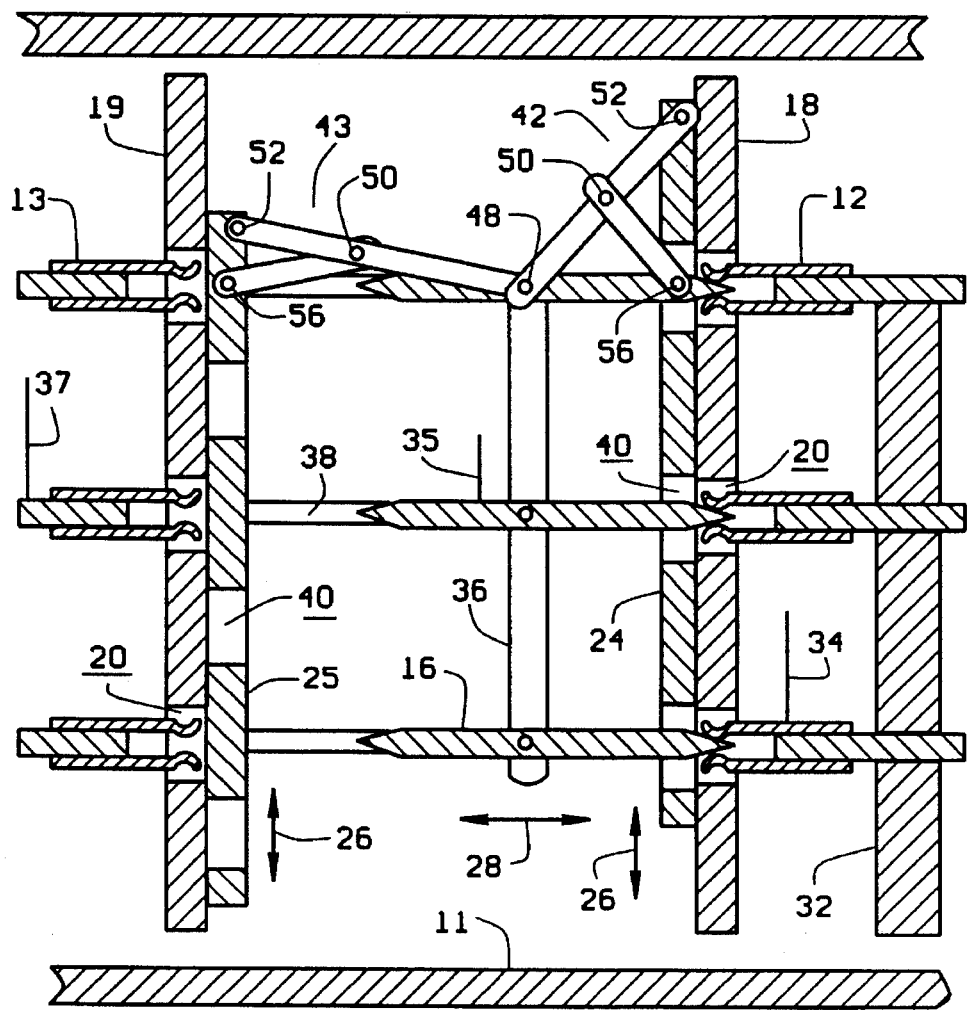
FIG. 3 is a cross section view of a multiphase combination circuit breaker-transfer switch employing linear motion of the moving contact and guillotine.

Referring now to FIG. 3, shown is a further embodiment of FIGS. 1 and 2 as might be used in multiphase switchgear, for example, three phase. The motion of moving contacts 16 and guillotine 24 are substantially linear and substantially orthogonal to each other, as shown in FIGS. 1 and 2 and explained in FIG. 4.

Referring again to FIG. 3, partition 18 is now provided with three spaced apart apertures 20. Each aperture is provided with a fixed contact 12, one for each phase. Contacts 12 may be mounted on and separated by spacing insulators 32 to provide rigidity and alignment. Leads 34 attached to contacts 12 pass through enclosure 11 to outside lugs. Three moving contacts 16 are provided to mate with fixed contacts 12. Leads 35 attached to contacts 16 are attached to external lugs. Contacts 16 are linked by arm 36 so as to move in unison. Suitable alignment means such as grooves or rails 38 are provided in opposing walls of housing 11 to guide moving contacts 16 to mate with fixed contacts 12 in the closed circuit position. Guillotine 24 is provided with three apertures 40, which when aligned with apertures 20 allow contacts 16 to penetrate in order to mate with contact 12. Mechanical linkage 42 is provided to couple the movement of moving contacts 16 with guillotine 24 such that when contacts 16 have engaged contacts 12 apertures 40 of guillotine 24 are aligned with apertures 20 of partition 18 thereby permitting union of contacts 16 and 12.

Upon sensing a fault condition, a suitable latch mechanism, which may be spring, magnetically, pneumatically or otherwise activated, causes contacts 16 to substantially simultaneously disengage from contacts 12 and retreat while guillotine 24 slides down on partition 18 and seals off aperture 20, as in FIG. 1, thereby substantially simultaneously quenching the arcs of all three legs of the three phase system.

The design of mechanisms for operation of switchgear are well known and are described in "Power Circuit Breaker Theory and Design" edited by C. H. Flurscheim, Peter Peregrimus Ltd; 1982, herein referred to as Flurscheim. Closing mechanisms may be, for example, spring, solenoid or pneumatic powered. Tripping mechanism and mechanical linkages may, for example, be a double-toggle closing mechanism with latch and trip catch, a cam-operated closing mechanism with latch and trip catch, a high-speed tripping mechanism latch type, or a high-speed tripping mechanism electrically held type. Detection of fault conditions may be, for example, electromagnetically or thermally, the methods of construction and execution being well known in the art. Any of the above or other suitable mechanisms well known in the art may be employed in the present invention.

Figure 4:
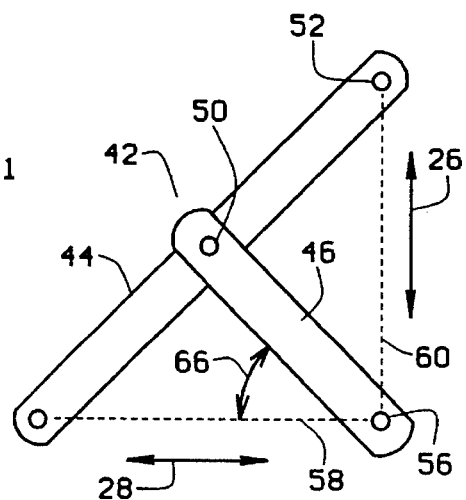
FIG. 4 is a side view of the linear mechanical linkage to simultaneously drive the movable contact and the guillotine.

Referring now to FIG. 4, linkage 42 consists of two strips of metal 44, 46. Strip 44 has three in holes 48, 50, 52. The spacing 54 between pins 48 and 50 is the same as that between 50 and 52. Metal strip 46 has the same two holes 56 and 50 with the spacing 54 between holes 50 and 56 equal to that of 48 and 50, and 50 and 52. By simple trigonometric analysis, it can be shown that, with pin 56 as the fixed pivot point, if pin 48 travels a straight line 58 through pin 56, then pin 52 will travel in a straight line 60 at exactly 90° to line 58.

Referring again to FIG. 3, it is seen that as moving contact 16 moves toward fixed contact 12, linkage 42 will cause guillotine 24 to rise, the motion being orthogonal to the movement of contact 16. This linear movement combined with force F (FIG. 1) on guillotine 24 ensures that guillotine 24 remains flush against partition 18 during the entire upward and downward motion thereby ensuring that the arc cannot find a gap to penetrate through.

A further improvement in the embodiment of FIG. 3 is to incorporate a transfer switch, often called bypass, into the circuit breaker. This has important benefits in application to adjustable speed drives (ASDs) for electric motors, uninterruptable power supplies or power conditioning systems, process controls and like systems where if there is a failure in the converter or inverter, there is an automatic switch over to direct line power with essentially no loss of function. This dual capability normally comes at considerable cost. In the present invention, the added cost is nominal.

Referring again to FIG. 3 where bypass capability has been built into a circuit breaker. Leads 35 to moving contacts 16 bring in the incoming line power. Fixed contacts 12 through lines 34 direct line power to the converters of systems such as ASDs, UPS and power conditioning. Opposing fixed contacts 13 through lines 37 direct power around (bypass) the ASDs, UPSs and power conditioning systems directly to the motors, process control equipment, computers etc. upon failure of the ASDs, UPSs and power conditioning systems. Thus, while repairs are being made, the end equipment is still functioning.

Again referring to FIG. 3, a substantially identical set of parts to guillotine 24, partition 18 and fixed contacts 12 comprising guillotine 25, partition 19 and fixed contacts 13 are set up in substantially mirror image fashion opposing 24, 18 and 12. A second linkage 43 that is substantially identical to 42 is provided. With contacts 16 centered, a slice down the center yields a substantially mirror image construction. Linkages 42 and 43 share pin 48 on moving contact 16 in common such that all motions are coupled. As can be seen, when moving contacts 16 have engaged contacts 12 in the current conducting closed circuit condition, apertures 40 of guillotine 24 align with apertures 20 of partition 18. At the same time guillotine 25 has sealed off apertures 20 of partition 19 containing bypass contacts 13 in the nonconducting current interrupted open circuit condition. Upon a fault condition, contacts 16 disengages from contact 12 and retreat along rail 38 driven by springs, electromagnets, pneumatically etc. As contacts 16 retreat, linkage 42 causes guillotine 24 to fall and seal off apertures 20 and quench the arcs as illustrated in FIG. 1. Simultaneously, linkage 43, which shares common pin 48 with linkage 42 on moving contacts 16, is generating an opposite action by causing guillotine 25 to rise such that aperture 40 will align with apertures 20 of partition 19 thereby enabling contacts 16 to mate with contacts 13 to close the bypass circuit which completes the power transfer or bypass. This method is unambiguous; it ensures that only one of contact 12 or 13 are closed. There is no way both 12 and 13 could be closed simultaneously for a potentially disastrous short circuit. Substantially precise synchronism of contact closure and opening may be achieved.

In case of end equipment failure, such as a motor, a lockout may be provided, such as a pin (not shown) that intercepts and stops moveable contact 16 at an intermediate position between contacts 12 and 13 such that guillotines 24, 25 cover apertures 20 in partitions 18, 19. In this manner, both circuits containing contacts 12 and 13 are in the open circuit condition with a total interruption of current flow. This capability may be incorporated into all embodiments of the present invention.

Figure 5:
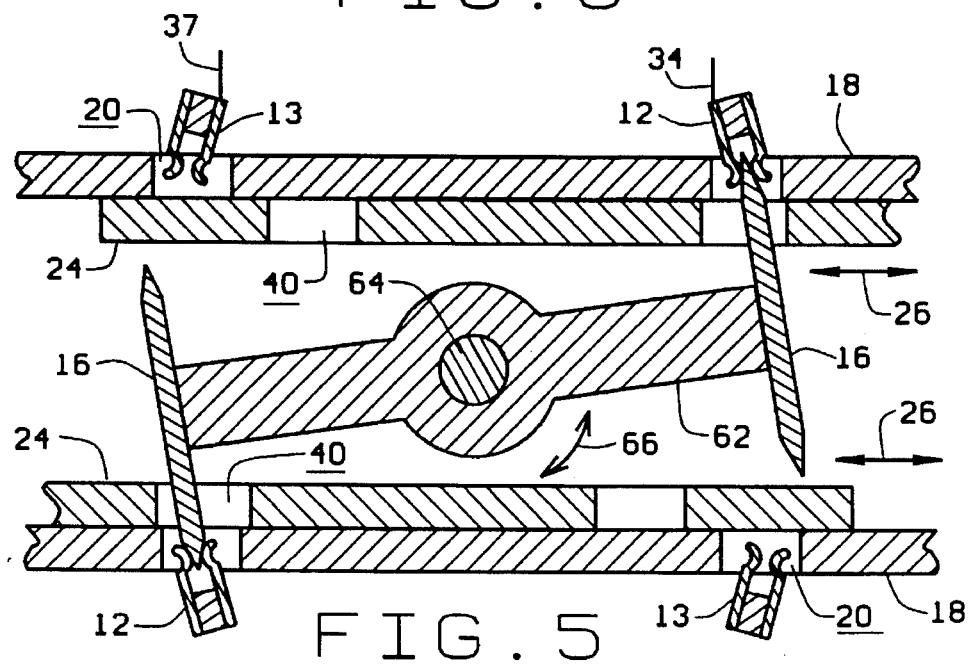
FIG. 5 is a side cross section view of a combination circuit breaker-transfer switch with multiple contacts employing rotary motion of the moving contacts and linear motion of the guillotine.

Referring now to FIG. 5, shown is a combination circuit breaker-transfer switch incorporating a curved motion, preferably circular, of moving contact 16 and a linear motion of guillotine 24. This is in contrast to FIG. 3 where both moving contact 16 and guillotine 24 move linearly.

Again, referring to FIG. 5, insulator assembly 62 is mounted on shaft 64 which in turn is attached at each end to the housing (not shown). Moving contacts 16 are mounted on opposing peripheries of insulator assembly 62 which may be an extrusion. Partitions 18 containing apertures 20 and fixed contacts 12 and 13, and guillotines 24 containing apertures 40 are constructed in a similar manner to those of FIG. 3. Mechanical linkages (not shown) perform the same function as linkages 42 and 43 of FIG. 3 in that as contacts 16 pivot 66 around drive shaft 64 the mechanical linkages simultaneously raise one guillotine 24 to align apertures 20 and 40 so that movable contact 16 can engage fixed contact 12 in the closed circuit condition as shown. At each opposing end of partitions 18, guillotines 24 are sealing off aperture 20 containing bypass contact 13 to the open circuit condition. To be noted is that each partition 18 contains one fixed contact 12 and one fixed bypass contact 13. This results from the rotational 66 action of contacts 16 as can be seen. Thus, two independent sets contacts 12 and bypass contacts 13 are available. One set of contacts 12 and bypass 13 may, for example, be employed in each leg of a single phase system, or contacts 12 may be paralleled, and contacts 13 may be paralleled to double capacity for use in one leg of a circuit.

Under a fault condition in the circuit including contacts 12, the drive mechanism is activated causing shaft 64 to pivot thereby disengaging contacts 16 and 12 while simultaneously causing guillotines 24 to cover apertures 20 containing contacts 12 to obtain the open circuit condition while aligning apertures 40 of guillotine 24 with apertures 20 containing contacts 13 such that contacts 16 may engage contacts 13 in the closed circuit condition. As described for FIG. 4, an intermediate position lock-out may be provided that prevents contact 16 from engaging either contacts 12 or 13 for system shutdown.

Referring again to FIG. 5, the overlap of guillotine 24 above and below aperture 20 in partition 18 serves a useful environmental purpose. In damp climates the coverage of partition 18 above and below aperture 20 by guillotine 24 protects the covered surface of partition 18 from accumulating moisture and its potential for sparking. If partition 18 and guillotine 24 are made of Teflon or other non-wetting material, condensing moisture will ball up due to surface tension and fall off vertical surfaces.

Figure 6:
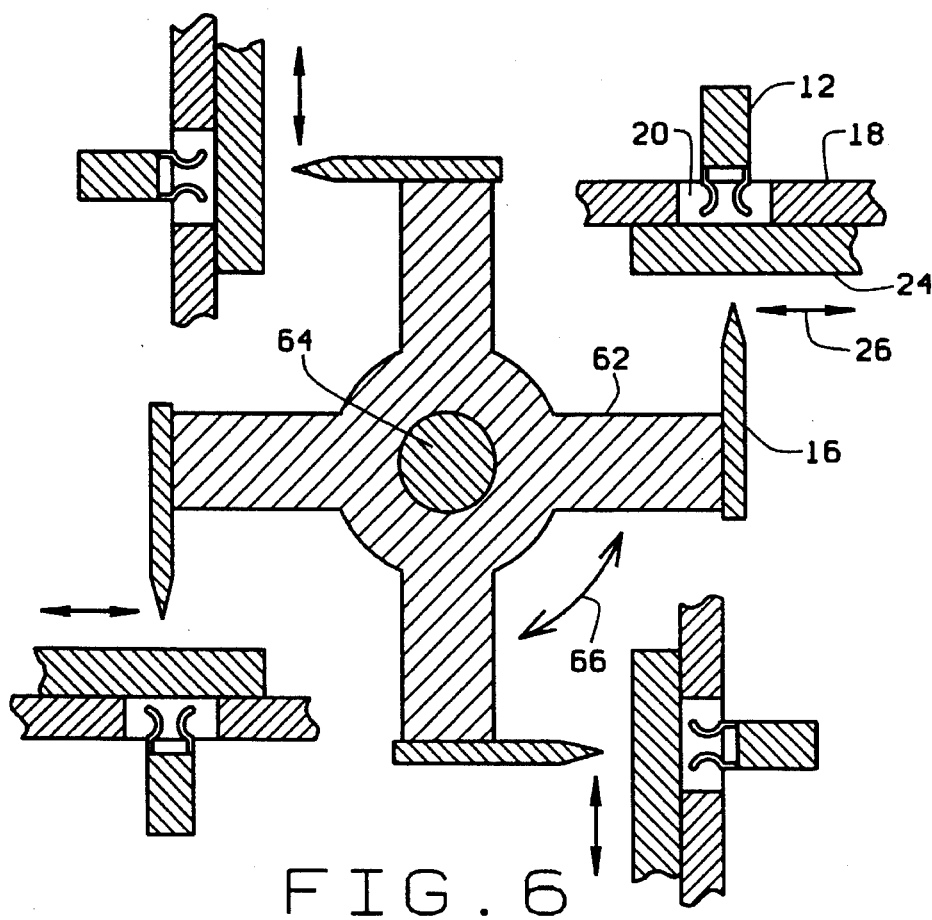
FIG. 6 is a side cross sectional view of a circuit breaker employing a rotary motion of the moving contact and a linear motion of the guillotine.

Referring now to FIG. 6, which is a switchgear, in this example designed as a circuit breaker with four sets of preferably substantially identical independent contacts 16 and 12, though more or less can be employed. The contacts may be used for independent circuits or may be paralleled in any combination to increase current capacity. The circuit breaker of FIG. 6 operates in fundamentally the same manner as the circuit breaker-transfer switch of FIG. 5. Moving contacts 16, in this example four, are mounted peripherally on insulator shaft 62 which, in turn, is preferably concentric with drive shaft 64. Four sets of partitions 18, fixed contacts 12 and guillotines 24, similar to those of FIG. 1, are mounted on each of the four walls of the housing (not shown). Mechanical linkages (not shown) similar to those of FIG. 5 are employed to substantially simultaneously cause guillotines 24 to close over apertures 20 in the open circuit condition after the withdrawing 28 of moving contacts 16 from fixed contacts 12 upon a fault condition.

Figure 7:
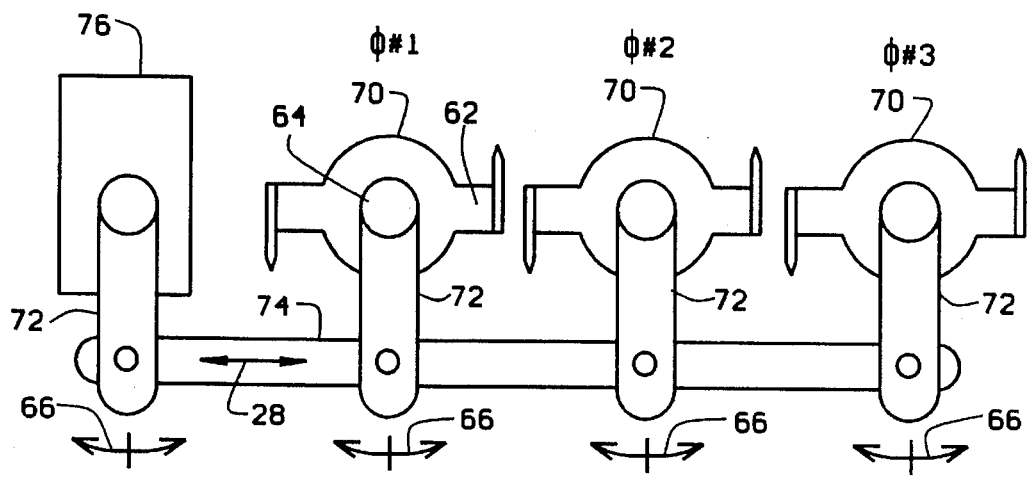
FIG. 7 is a schematic side cross sectional view of multiple rotary structures of FIGS. 5 and 6 mechanically linked for synchronous making and breaking of contacts.

Referring now to FIG. 7, shown is a plurality of preferably substantially identical rotational contact assemblies 70 of either FIG. 5 or 6 comprising drive shafts 64, insulator shafts 62 and contacts 16. Not shown for clarity purposes are partitions 18, guillotines 24 and contacts 12. Each rotational assembly 70 may be attached to one leg of a multi-phase system, in this illustration a three phase system. A fourth assembly 70 may be added for a four pole switchgear to switch grounds.

To provide synchronous switching of all assemblies 70, that is, substantially simultaneous making and breaking of all contacts 16, 12 and 13, and to obtain uniform separation and closing speeds of the contacts, uniformly dimensioned arms 72 extend from shafts 64 to coupling rod 74. Coupling rod 74 is connected to drive mechanism 76 though arm 72. Upon a fault condition, drive mechanism 76 through arm 72 causes coupling rod 74 to move each of arms 72 substantially the same distance at the same instant thereby ensuring that contact make and break between the plurality of contacts 16 and 12 are substantially simultaneous. This is much like the old steam driven train engines where several wheels were synchronously driven by one drive rod. If non-synchronous circuit opening and closure are desired, this may be built in with suitable linkages so that each of the contacts closes or opens in a predetermined sequence.

Figure 8:
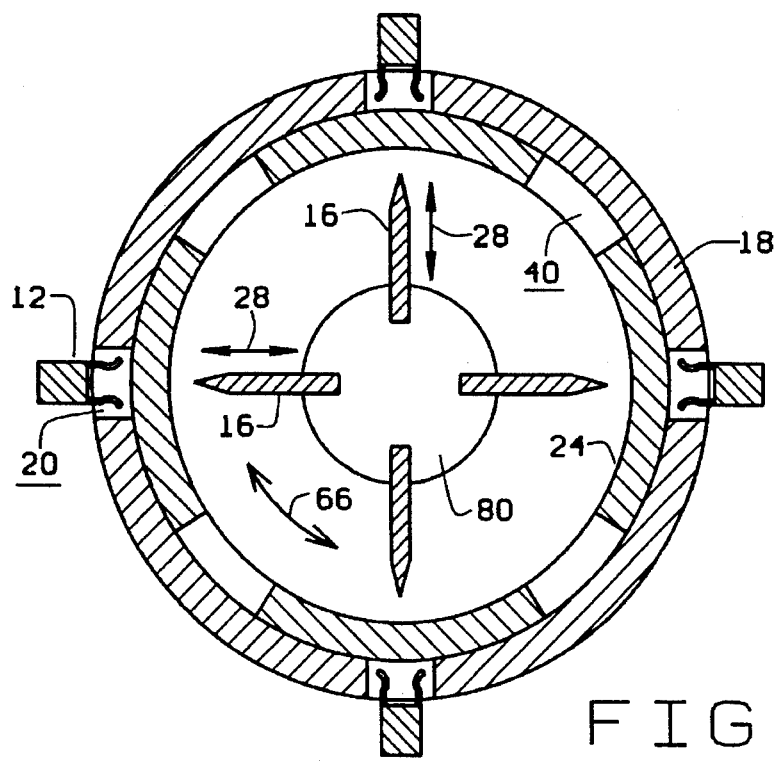
FIG. 8 is a partial side cross sectional view of a circuit breaker with rotary motion of the guillotine and linear motion of the movable contacts.

Referring now to FIG. 8, shown is a further preferred embodiment of the present invention incorporation a curvilinear motion, preferably circular, of guillotine 24 and a linear motion, in this example, radial, of moving contacts 16. Partition 18 is in a generally cylindrical shape shown with four apertures 20, though more or fewer may be employed. Guillotine 24, also in a generally cylindrical shape is concentric with and in close proximity to partition 18. That is, the inside diameter of partition 18 and the outside diameter of guillotine 24 are virtually touching each other with only sufficient spacing to ensure that large static and moving frictional forces do not result. Guillotine 24 is shown with four apertures 40 corresponding with those of partition 18. Fixed contacts 12 are positioned in apertures 20 of partition 18 in the same basic manner described in FIGS. 3, 5 and 6. Moving contacts 16 are shown radially positioned and mounted within drive mechanism 80 that causes contacts 16 to move radially inward and outward 28 while simultaneously rotating 66 guillotine 24.

As shown in FIG. 8, moving contacts 16 have been pulled radially inward in the open circuit condition and guillotine 24 is rotated to cover apertures 20 of partition 18. Thus, the contacts 12 and 16 are separated and isolated from each other providing a current interrupting open circuit. Upon actuation of drive mechanism 80, contacts 16 move radially outward toward fixed contacts 12 while guillotine 24 is rotating 66 to align apertures 40 with apertures 20 of partition 18. Upon completion of the movement, moving contacts 16 have engaged fixed contacts 12 to complete the circuit. Since all contacts move substantially in unison, electrical connection is made and broken at substantially the same time. This characteristic is to be found in all embodiments described herein.

As used in the present invention, moving contact 16 and fixed contact 12 may take almost any convenient form such as: butt, finger and blade, and bridging. Preferred construction is finger and blade. In the embodiments described herein, moving contact 16 is shown as a blade and fixed contacts 12 and 13 are shown as finger construction. If desired, the fingers 12 may become the moving contact and the blade 16 the fixed contact. To be described is a novel construction of the finger and blade type that offers special advantages.

Figure 9:
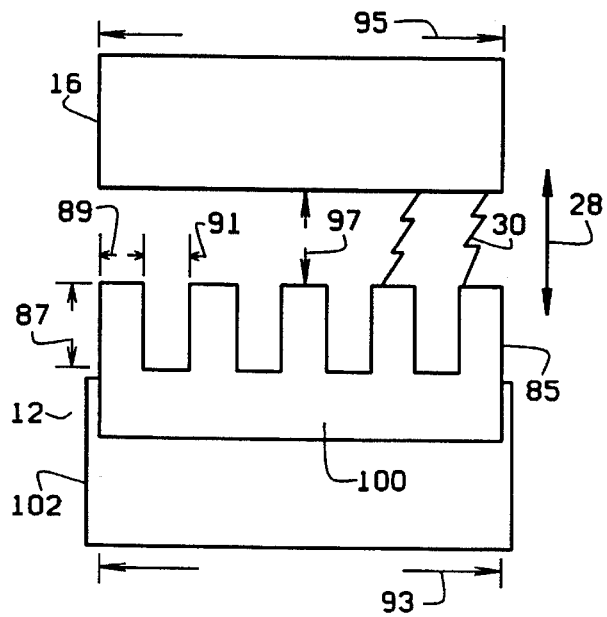
FIG. 9 is a top down view of finger and blade contact illustrating layout and arcing characteristics.

Referring now to FIG. 9, shown is a preferred finger and blade assembly. Blade 16 which is made of a suitable metal or combination of metals such as Cu, Cu—Cr, WAg, WCu, beryllium copper, dispersion hardened copper alumina ($Al_2O_3$) and the like, and finger assembly 12 may be made of similar metals.

The length 95 of blade 16 and the length 93 of finger assembly 12 are determined primarily by current carrying requirements. The lengths 95, 93 may vary from about a centimeter for low currents to a probable maximum of about one half meter long for very high currents. Probable lengths range from about 2 cm to about 30 cm. Finger 85 dimensions may range, for example, from 0.5 mm to 5 mm in width 89, from about 0.2 cm to 5 cm in length 87, and spacing 91 between fingers 85 may range from about 0.1 mm to 3 mm. Thickness 68, FIG. 10, of finger 85 may range from about 0.01 cm for material with spring characteristics such as BE—Cu or Cr—Cu and up to about 0.5 cm for copper. In general, blade 16 and finger 12 assemblies are linear in construction.

Figure 10:
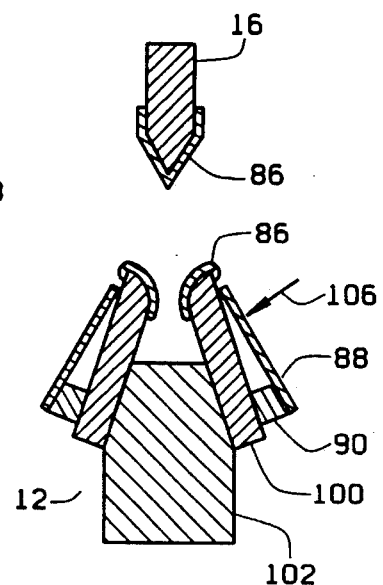
FIG. 10 is a side cross section view of FIG. 9.
Figure 11:
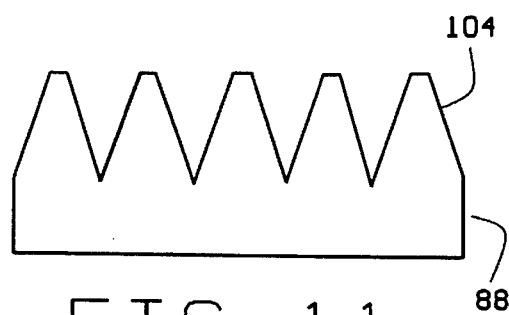
FIG. 11 illustrates construction of the multi-leafed sheet spring.

Referring now to FIG. 10, the cross sectional view of the finger 12 and blade 16 assembly shows preferably substantially identical opposing finger strips 100 construction mounted on metal plate 102, which may be copper. Both blade 16 and fingers 85 may be silver coated 86, by plating, CVD or other suitable process, to provide low resistance contacts, with the coating on one preferably harder than the other. Should finger strip 100 be copper, which has poor spring characteristics, an auxiliary spring 88 may be employed. Spring 88 may be of sheet spring steel that is made by stamping, EDM, chemical milling or other suitable technique and then tempered to suitable spring properties. Referring now to FIG. 11, each leaf 104 of spring 88 aligns with a finger 85 thereby providing independent pressure on each finger 85. Spring leafs 104 may be in the general shape of a truncated triangle to optimize applied force characteristics.

Referring again to FIG. 10, finger strips 100 may be angled 99 with respect to the axis of motion 28 of blade 16 such that blade 16 only contacts the silver coated 86 surfaces of fingers 85. Sheet spring 88 may be mounted on stand-off 90 and angled such that leaves 104 provide a predetermined force 106 to the ends of fingers 85 such that when blade 16 engages fingers 85 a predetermined pressure is applied to blade 16 by opposing fingers 85 thereby ensuring quality repeatable electrical contacts. In general, it is not desirable to have significant current pass through magnetic metals. Because the sheet spring 88 is thin, 0.25 mm for example, and has high electrical resistivity only a small percentage of current will be shunted. However, stand off 90 may be an insulating material, thereby by reducing current flow to a negligible amount. Because fingers 85 have such high conductivity, only a low level of electrical isolation of spring 88 is needed. Mounting means of finger strip 100 and sheet spring 88 to plate 102 may be by screws, rivets, soldering, adhesives or other suitable means.

The novel blade and finger design shown in FIG. 9 provide unique operational characteristics. Conventional blade and finger assemblies, as exemplified in household manually operated switch boxes, are characterized by a single set of relatively wide fingers opposing the blade. No matter how precise such an assembly is made, the blade will contact the mating surface of the fingers at only a few points. Furthermore, when the switch is opened, in general, a single arc will ensue at the point of lowest impedance between blade and fingers because of the single piece construction of blade and fingers, that is, the arc is free to travel up or down the length of the single piece construction of the blade and fingers. At household current levels this presents no difficulty, however, at industrial power levels, the power levels of the arc can cause localized melting and pitting of the switchgear. A number of methods, including those previously described, are employed in present practice to control arcs and their consequential damage.

The present invention further provides an improved linear finger and blade construction as used in switchgear. Referring now to FIGS. 9 and 10, the beneficial characteristics of the multiple finger 85 construction provides that each of multiple fingers 85 provides an independent, consistent and solid electrical contact with blade 16 provided by the spring pressure of the finger 85 itself or pressure from each spring leaf 104. This is in contrast to the relatively few and random contacts provided by conventional linear blade and finger construction. Alternative to sheet spring 88, force 106 may be applied by a suitably inert and high temperature elastomer of suitable durometer, for example, a strip of high temperature 371° C. (700° F) silicone rubber, which is often red in color. In this manner independent force 106 is applied to each finger 85.

Each finger 85 has associated with it a small but finite inductance (L) The inductance (L) may be varied by changing any or all of the dimensions 87, 89 and 68 of finger 85. Upon a fault or short circuit condition, the drive mechanism is tripped and the moving contact, blade 16, disengages from fixed contact finger assembly 12 generating arcs 30. The combination of the finger 85 inductance (L) and the rapidly changing current (di/dt) in the arc generates a voltage, $\Delta V = -L \, di/dt$. This developed voltage inhibits the current from coalescing into a single arc as occurs in conventional linear finger and blade construction. Rather each finger acts substantially as an independent arc source. By maintaining substantially uniform spacing 97 between fingers 85 and blade 16 as blade 16 is withdrawn 28 from fingers 85, the impedance of arcs 30 seen by each finger 85 is substantially the same. Thus, with substantially uniform voltages developed for each finger 85 due to L di/dt and a uniformly changing arc impedance seen by each finger 85, substantially uniform multiple arcs 30 equal to the number of fingers are established.

Thus, if the short circuit current is 10,000 A and there are 200 fingers, 100 on each side, which might be a length 95, 93 of about 25 cm (10 inches) for blade 16 and fingers 12, then the current carried by each finger is 50A. The energy in the 50A arc to each finger is orders of magnitude less than that of a single 10,000 A arc with its consequent possibilities for contact welding as well as the pitting and melting of contacts.

Referring again to FIGS. 9 and 10, fabrication of finger strip 100 may be by extruding the material in strips complete with curved electrical contact surfaces and to proper width. Finger strips 100 may then be cut to length 93, FIG. 9, plated with silver, or other material for contacts, as appropriate, and then multiple pieces stacked and simultaneously slotted 91 to obtain fingers 85 of predetermined dimensions. Single pass slotting may be done with appropriately spaced ganged slotting saws on a mill, for example, or it may be done by EDM technique or other suitable methods. Contact 16 may also be extruded, cut to size and then silver or otherwise plated if necessary. In this manner inexpensive contacts capable of high total current capacity may be made. Present switchgear contacts, because of the very high short circuit arc currents that must be endured require expensive material and elaborate fabrication resulting in high costs. The distributed arc characteristic of the present invention reduces the energy in any one arc by orders of magnitude thereby permitting low cost, mass produced contacts to be used in switchgear.

Should thermal management considerations require that more of the heat be deposited at the ends of blade 16 and fingers 85, the inductance (L) of fingers 85 can be altered, e.g. lowered, by reducing length 87, widening width 89 or some combination of both. The result will be a localized increase in current to maintain the same voltage drop across all fingers 85.

Figure 12:
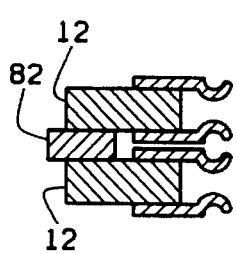
FIG. 12 is a cross section view of compactly stacked finger and blade connectors electrically connected to increase current capacity.

Referring now to FIG. 12, shown are stacked and electrically connected finger 12 and blade 16 assemblies to increase current carrying capacity. Finger assemblies 12 are connected, for example, by soldering or brazing, along their length 93, FIG. 9, by conducting spacer 82, which may be copper. In like manner, contacts 16 are connected along length 95, FIG. 9, by spacer 84. The dimensions of spacers 82, 84 are such that the axis of contacts 16 along the direction of motion and the corresponding axis of fingers 12 are substantially coincidental for uniform mating. Though only two sets of contacts 16 and fingers 12 are illustrated in FIG. 12 as being stacked, more may be stacked in like manner to further increase the current carrying capacity.

The geometry shown in FIGS. 9 and 10 now provide a new class of arc called a distributed arc which substantially reduces dissipated energy at any point along lengths 95, 93 of contacts 16, 12 thereby minimizing pitting of contacts and substantially reducing the erosion rates of insulators partition 18 and guillotine 24. This provides long life and better ensures consistent performance. In conventional finger and blade practice, the blade does not disengage uniformly from the fingers, and this is deliberate. The end of the blade to disengage last from the fingers is where the arc generally ignites and it is here that the arc chute or other arc control means is placed to ensure that the arc engages the arc chute, and at the earliest possible moment to minimize pitting of the contacts. This provides the most consistent performance possible. Here all the arc energy is concentrated in a single arc in contrast to the present invention where the arc is broken up into multiple smaller and more manageable arcs. The present invention may be employed with any atmosphere, including air, nitrogen and $SF_6$.

I claim:

1. Apparatus comprising:
 a first electrically insulating member having at least one aperture,
 at least one fixed contact,
 at least one movable contact movable between a closed current carrying position with said fixed contact and an open current-interrupting position, said movable contact at least partially located in said first insulating member aperture when in said closed current carrying position, and
 a movable second electrically insulating member coupled to said movable contact at all times so that when the movable contact moves so does the movable second electrically insulating member and so that when current flow is interrupted by moving said movable contact to said open current-interrupting position, said movable second electrically insulating member covers said first insulating member aperture and extends beyond all edges of said first insulating member aperture, and any arc between said fixed contact and said movable contact is extinguished.

2. Apparatus in accordance with claim 1 further comprising a housing, said first electrically insulating member forming a partition in said housing.

3. Apparatus in accordance with claim 2 wherein said fixed contact is at least partially located in said aperture.

4. Apparatus in accordance with claim 1 wherein said movable second electrically insulating member is in sliding contact with said first insulating member.

5. Apparatus in accordance with claim 4 wherein said movable second electrically insulating member has a dielectric strength greater than a voltage applied across said fixed and said movable contacts.

6. Apparatus in accordance with claim 1 wherein said movable contact moves linearly.

7. Apparatus in accordance with claim 1 wherein said movable insulating member moves linearly.

8. Apparatus in accordance with claim 1 wherein said movable contact moves along a circular path segment.

9. Apparatus in accordance with claim 1 wherein said movable insulating member moves along a circular path segment.

10. Apparatus in accordance with claim 1 further comprising a plurality of fixed contacts, a plurality of movable contacts, and a plurality of apertures in said first electrically insulating member, each of said movable contacts at least partially located in one of said respective apertures when in said closed current carrying positions with one of said respective fixed contacts, said movable second electrically insulating member covering each of said apertures when current flow is interrupted by moving said movable contacts to said open current-interrupting positions.

11. Apparatus in accordance with claim 1 wherein said movable second electrically insulating member has an aperture formed therein, said moving member aperture being aligned with said aperture of said first insulating member, said movable contact at least partially located in said aligned apertures when in said closed current carrying position.

* * * * *